(12) United States Patent
Hicks, III et al.

(10) Patent No.: US 9,674,573 B2
(45) Date of Patent: *Jun. 6, 2017

(54) APPARATUS AND METHOD FOR PROVIDING COMMUNICATION SERVICES

(71) Applicant: AT&T INTELLECTUAL PROPERTY I, LP, Atlanta, GA (US)

(72) Inventors: John Alson Hicks, III, Roswell, GA (US); Nicholas Steven Huslak, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,151

(22) Filed: Oct. 14, 2015

(65) Prior Publication Data

US 2016/0037216 A1 Feb. 4, 2016

Related U.S. Application Data

(63) Continuation of application No. 12/836,679, filed on Jul. 15, 2010, now Pat. No. 9,191,711.

(51) Int. Cl.
| | |
|---|---|
| H04N 7/173 | (2011.01) |
| H04N 21/4402 | (2011.01) |
| H04N 21/41 | (2011.01) |
| H04N 21/478 | (2011.01) |
| H04N 21/654 | (2011.01) |

(Continued)

(52) U.S. Cl.
CPC . *H04N 21/440218* (2013.01); *H04N 21/2543* (2013.01); *H04N 21/2665* (2013.01); *H04N 21/4122* (2013.01); *H04N 21/4363* (2013.01); *H04N 21/43615* (2013.01); *H04N 21/4622* (2013.01); *H04N 21/47815* (2013.01); *H04N 21/654* (2013.01); *H04N 21/6581* (2013.01); *H04N 21/8173* (2013.01)

(58) Field of Classification Search
USPC .................................................. 725/74–104
See application file for complete search history.

(56) References Cited

U.S. PATENT DOCUMENTS

| | | | | |
|---|---|---|---|---|
| 4,890,168 A | * | 12/1989 | Inoue ..................... | G11B 15/02 348/565 |
| 6,005,861 A | * | 12/1999 | Humpleman .......... | H04L 29/06 370/352 |

(Continued)

*Primary Examiner* — Mushfikh Alam
(74) *Attorney, Agent, or Firm* — Guntin & Gust, PLC; Joseph Hrutka

(57) ABSTRACT

A system that incorporates teachings of the present disclosure may include, for example, a gateway having a controller operable to receive media content from first and second service providers where the first and second service providers deliver the media content to the gateway using different transport protocols, provide the media content from the gateway to a plurality of display devices without utilizing a set top box, receive a request for a service associated with a third service provider where the request is received at the gateway, receive an application resource bundle at the gateway to implement the requested service where the application resource bundle is received from a server associated with one of the first, second and third service providers, and implement the service without identifying the third service provider. Other embodiments are disclosed.

20 Claims, 11 Drawing Sheets

(51) Int. Cl.
    *H04N 21/658*     (2011.01)
    *H04N 21/81*     (2011.01)
    *H04N 21/2543*     (2011.01)
    *H04N 21/2665*     (2011.01)
    *H04N 21/436*     (2011.01)
    *H04N 21/4363*     (2011.01)
    *H04N 21/462*     (2011.01)

(56) References Cited

U.S. PATENT DOCUMENTS

| | | | |
|---|---|---|---|
| 6,317,884 B1 * | 11/2001 | Eames | H04L 12/2856 348/E5.002 |
| 6,732,366 B1 * | 5/2004 | Russo | A01H 5/10 348/E7.07 |
| 6,871,188 B2 * | 3/2005 | De Souza | G06Q 30/0633 348/E7.073 |
| 7,209,945 B2 | 4/2007 | Hicks, III et al. | |
| 7,992,178 B1 * | 8/2011 | Nathan | G11B 27/105 709/221 |
| 8,250,614 B1 * | 8/2012 | Ellis | H04N 21/4334 725/100 |
| 8,555,331 B2 * | 10/2013 | Limbasia | H04N 7/162 725/140 |
| 2002/0019984 A1 * | 2/2002 | Rakib | G08B 13/19656 725/111 |
| 2005/0144645 A1 | 6/2005 | Casey et al. | |
| 2005/0229203 A1 * | 10/2005 | Jutzi | H04N 5/50 725/14 |
| 2006/0236357 A1 * | 10/2006 | Walker | G06Q 30/06 725/105 |
| 2007/0250900 A1 | 10/2007 | Marcuvitz | |
| 2007/0283381 A1 * | 12/2007 | Sidi | H04N 5/4401 725/32 |
| 2008/0168519 A1 * | 7/2008 | Rao | G06F 3/14 725/127 |
| 2008/0168523 A1 * | 7/2008 | Ansari | G06Q 30/04 725/131 |
| 2008/0205419 A1 | 8/2008 | Shin et al. | |
| 2008/0267076 A1 * | 10/2008 | Laperi | H04M 11/062 370/242 |
| 2008/0271106 A1 * | 10/2008 | Patel | H04N 21/42204 725/118 |
| 2009/0100492 A1 * | 4/2009 | Hicks, III | H04L 12/2825 725/127 |
| 2010/0005496 A1 * | 1/2010 | Ellis | H04N 7/17309 725/87 |
| 2010/0313226 A1 * | 12/2010 | Cholas | H04N 7/17318 725/92 |
| 2010/0325672 A1 | 12/2010 | Barnett, Jr. et al. | |
| 2011/0099591 A1 * | 4/2011 | Long | H04N 7/1675 725/81 |
| 2011/0126104 A1 * | 5/2011 | Woods | G11B 27/32 715/719 |
| 2011/0219419 A1 | 9/2011 | Reisman | |
| 2012/0148211 A1 * | 6/2012 | Ellis | H04N 5/44543 386/238 |
| 2012/0240177 A1 | 9/2012 | Rose | |
| 2013/0042266 A1 * | 2/2013 | Roberts | H04N 7/16 725/37 |
| 2013/0185747 A1 | 7/2013 | Candelore et al. | |
| 2013/0191855 A1 | 7/2013 | Godas | |

* cited by examiner

In Region VDSL Deployment

600

In Region ADSL Deployment

Out of Region BYOB Deployment

900

APPARATUS AND METHOD FOR PROVIDING COMMUNICATION SERVICES

CROSS REFERENCE TO RELATED APPLICATIONS

This application is a continuation of and claims priority to U.S. patent application Ser. No. 12/836,679, filed Jul. 15, 2010, now U.S. Patent Publication No. 2012/0017253. The contents of the foregoing are hereby incorporated by reference into this application as if set forth herein in full.

FIELD OF THE DISCLOSURE

The present disclosure relates generally to communication systems and more specifically to an apparatus and method for providing communication services.

BACKGROUND

Media consumption has become a multibillion dollar industry that continues to grow rapidly. Collectively, improvements in viewing, audio, and communication technologies are causing rapid demand for consumption of all types of media content.

The media content is being delivered to consumers from service providers using various delivery techniques. Consumers are being provided with a vast range of options to choose from, which can include overlapping services. The types of services can vary widely and can require a multitude of equipment.

DETAILED DESCRIPTION

One embodiment of the present disclosure can entail a gateway having a controller operable to receive media content from first and second service providers where the first and second service providers deliver the media content to the gateway using different transport protocols, provide the media content from the gateway to a plurality of display devices without utilizing a set top box, receive a request for a service associated with a third service provider where the request is received at the gateway, receive an application resource bundle at the gateway to implement the requested service where the application resource bundle is received from a server associated with one of the first, second and third service providers, and implement the service without identifying the third service provider.

One embodiment of the present disclosure can entail a non-transitory computer-readable storage medium, comprising computer instructions to receive media content at a gateway from first and second service providers, provide the media content from the gateway to a plurality of display devices, receive at the gateway a request for a service associated with a third service provider, implement the service without identifying the third service provider, and charge a purchase of the service to an account associated with one of the first and second service providers without identifying the third service provider.

One embodiment of the present disclosure can entail a method comprising receiving media content at a gateway from first and second service providers where the first and second service providers deliver the media content to the gateway using different transport protocols, providing the media content from the gateway to a plurality of display devices without utilizing a set top box, receiving a request for a service associated with a third service provider, the request being received at the gateway, receiving an application resource bundle at the gateway to implement the requested service where the application resource bundle is received from a server associated with the first service provider, implementing the service using the gateway, and in response to a cancellation of the service received at the gateway, disabling the application resource bundle or deleting the application resource bundle from a memory of the gateway.

Figure 1:
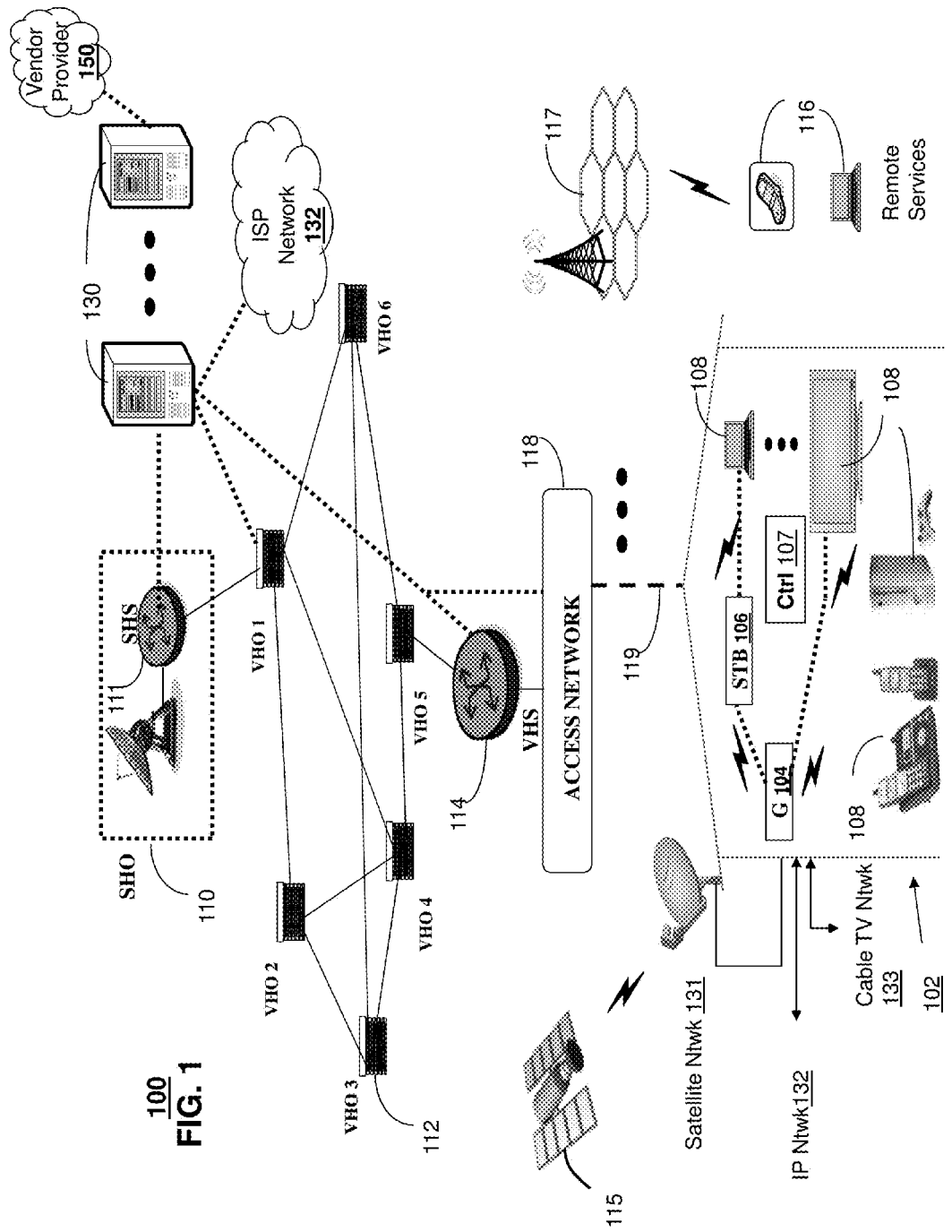
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system although other media broadcast systems are contemplated by the present disclosure in combination with or in place of the IPTV system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to communication devices capable of presenting the media content. In one embodiment, the gateway can provide the media content directly to one or more display devices without the use of a set top box or other media processor. In another embodiment, the gateway 104 can provide the media device to media processors 106 such as Set-Top Boxes (STBs) which in turn present broadcast channels to media devices 108 such as computers, television sets, gaming consoles (e.g., PS3, Xbox or Wii) managed in some instances by a media controller 107 (such as an infrared or RF remote control, gaming controller, etc.). The exemplary embodiments contemplate home networks that have display devices without any set top boxes; home networks that have display devices with and without set top boxes; and home networks that have display devices which each having a set top box.

The gateway 104 can include one or more of the following: an application execution environment for receiving media content or other data in one or more formats or according protocols; Java virtual machine and/or software development kits for $3^{rd}$ party application development associated with the gateway; an operating system such as a Linux OS; encryption engine such as a Crypto Engine; VoIP ATA Function and multiple (e.g., two) ports; Digital Living Network Alliance (DLNA) media server; and multiple (e.g., four) port Ethernet Switch.

The gateway 104 can also include one or more of the following: USB ports; various interfaces (e.g., WAN Ethernet, ADSL2+ and VDSL2; 802.11b/g/n communication capability); G.hn or other communication protocol for delivery over powerline, coax and telephone wiring; ZigBee communication capability; remote management, maintenance and downloading; plug-in module capability including hard drive, Femtocell mobile base station; and HD Voice DECT base station.

The gateway 104 can provide one or more of the following services: Video: direct broadcast satellite, Video-on-Demand, Off-the-Air TV, Over-the-Top TV, IPTV; and Voice: VoIP and Femtocell. The gateway 104 can also provide one or more of the following services: DLNA media server with network backup (photos, music, and video); home monitoring, automation and control; third-party monitored home security; remote utility meter reading; and remote medical monitoring.

In one embodiment, when a services gateway is installed at a residence or other location, applications can be automatically downloaded from a service management system, installed and provisioned. In another embodiment, when a customer signs up for a new service, the new application can be automatically downloaded from a component management system, installed and provisioned. In yet another embodiment, the applications, whether they are associated with the service provider or with a third party vendor, can be downloaded to the services gateway without user intervention. In another embodiment, third party services, including telecommunication services and/or non-telecommunication services, can be provided to a customer without providing the identity of the third party. For instance, the third party service can be billed to the customer using aggregate billing with the communication services. In one embodiment, Java bundles can be provided to the gateway 104 to implement a service. In another embodiment, the services can be implemented using software downloaded to the gateway 104 and/or software accessed by the gateway that is remote from the gateway.

In one embodiment, the system 100 allows for content to be presented that is aggregated from multiple sources. The services gateway 104 can function to convert a plurality of proprietary protocols of the media content to standard DLNA protocol or another standard protocol that allows for universal delivery of media content to one or more display devices, such as utilizing a common format for delivering the media content from the gateway to each of the display devices located in the building, including different types of display devices such as a TV, a cell phone, a desktop computer, and so forth.

In another embodiment, the service provider can provide an open approach to application development such that the services gateways are provided with an SDK or other tool for facilitating third party application development that is usable with the services gateway. In one embodiment, a certification process can be established for applications developed by the third party for the service gateway prior to offering the application for sale, such as through an application store managed by the service provider. A services gateway store, whether on-line or a physical location, can be used by content creators or application developers to deliver applications and services.

The gateway 104, the media processors 106, and/or the media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, and so on).

The computing devices 130 can be in communication with one or more vendors or other service providers 150 for providing additional services to the building 102. The additional services can be telecommunication services and/or can be non-telecommunication services, including other utilities, medical monitoring, home security, home automation, and so forth. For example, the computing devices 130 can be in communication with one or more utility service providers, such as the power company or water company, to enable communication between the other provider and the building 102.

For instance, remote monitoring can be performed by a utility service provider through use of the gateway 104. Data associated with the utility service being provided at the building 102 can be communicated to the utility service provider, including consumption. This data can be used by the utility service provider for a number of functions, including billing, remote control (e.g., powering down certain appliances having remote control units attached thereto to avoid a brown out in the region), and providing information to the customer (e.g., consumption statistics and instructions on how to reduce the costs). In another embodiment, the data can be retrieved by the gateway 104 and presented or otherwise utilized at the building 102 without transmitting the data to the particular service provider. For instance, medical monitoring using medical devices in communication with the gateway 104 can be performed where the medical data is transmitted from the medical devices to the gateway 104 and presented or otherwise utilized by the gateway without the gateway transmitting the medical data outside of the building 102. The medical data can be utilized in various ways, such as presentation of the medical data on the display devices, providing information that is triggered based on the medical data meeting particular thresholds, and so forth. In another embodiment, the remote monitoring can include parallel or backup communication means, such as direct communication between the service provider and its device located in the building 102 in the event that the gateway 104 is unable to communicate the data to the service provider.

In one embodiment, the data can be used for aggregate billing. For instance, billing for two or more different service providers can be included in the same bill, such as a bill for satellite and IPTV services or a bill for Internet access and electricity. The aggregate billing can be between different service providers in a similar services type or can be for different service providers in different service types. In one embodiment, the remote monitoring can be utilized to provide the customer with real-time information related to the services received. For example, a real-time energy consumption GUI can be provided that presents the current consumption and current cost as it is being incurred.

In another embodiment, a satellite broadcast television system can be used in addition to, or in place of, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the gateway 104 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in addition to, or in place of, the IPTV media system described above. In this embodiment, the cable TV system 133 can provide Internet, telephony, and interactive media services.

It is contemplated that the present disclosure can apply to any present or next generation over-the-air and/or landline media content services system.

Figure 2:
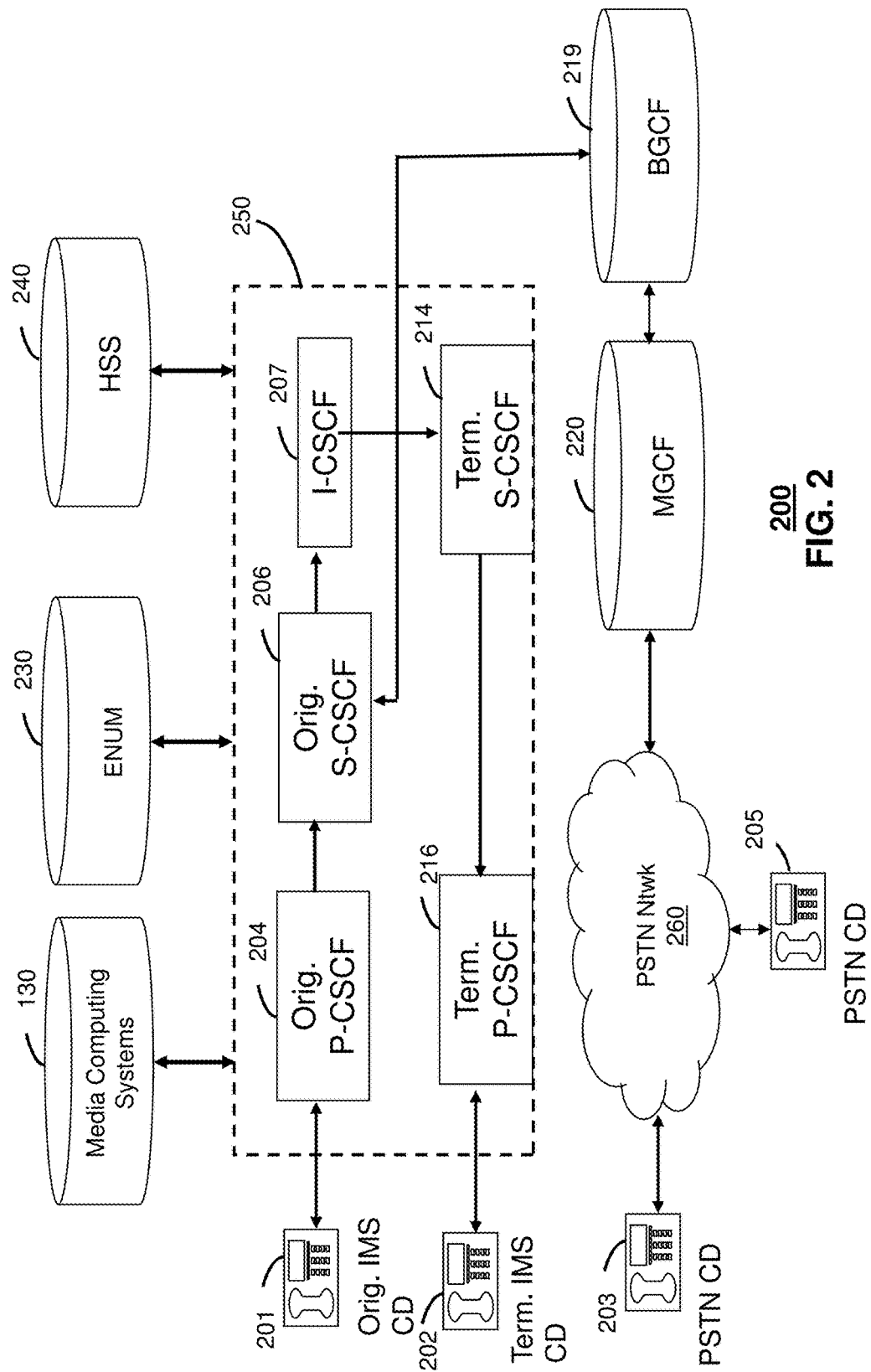

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is generally not used when a communication session involves IMS CD to IMS CD communications. Any communication session involving at least one PSTN CD can require the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

The first communication system 100 can be operatively coupled to the second communication system 200 by way of computing systems 130 (or other common communication means) to interchangeably share services between said systems. The first and second communication system 100 and 200 can be used for multimedia communication sessions using multiple services providers and using circuit-switched and packet-switched communications.

Figure 3:
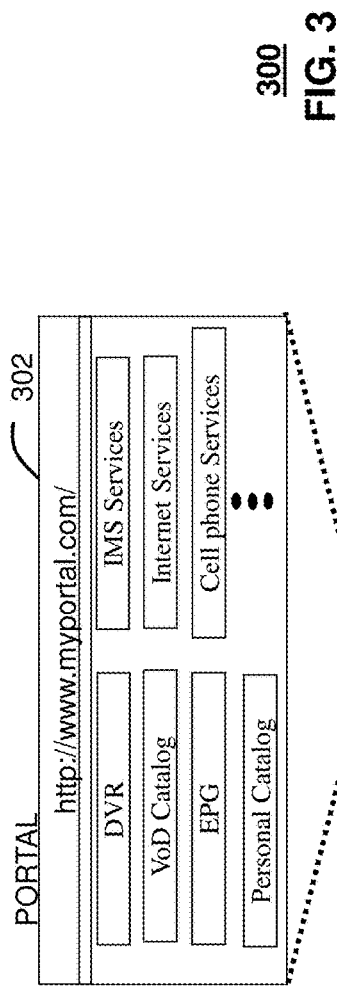
FIG. 3 depicts an illustrative embodiment of a portal interacting with the communication systems of FIGS. 1-2.
Figure 3:
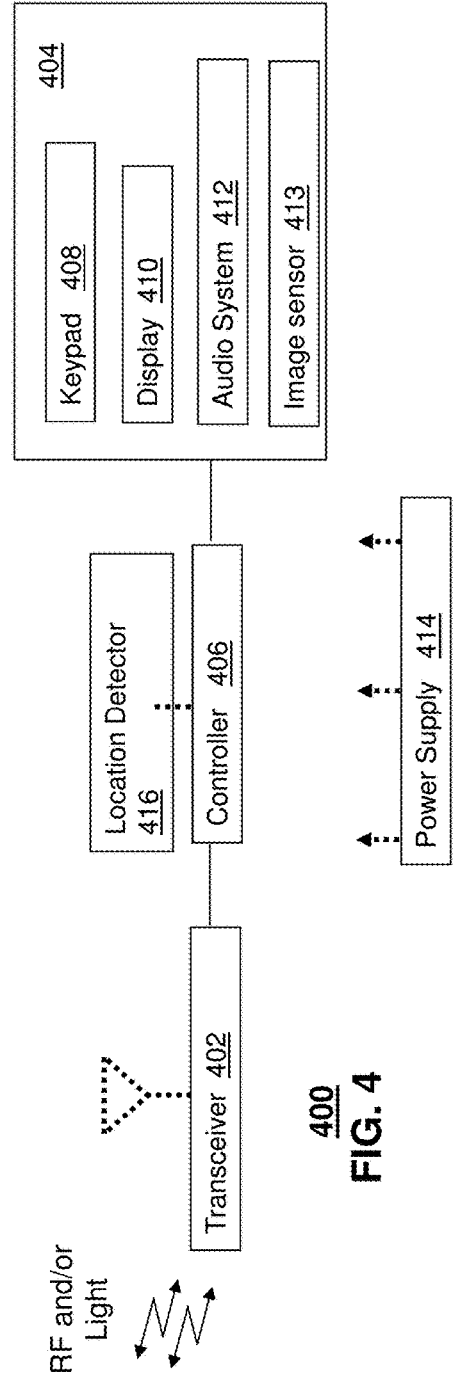

FIG. 3 depicts an illustrative embodiment of a portal 302 which can operate from the computing devices 130 described earlier of communication systems 100 and 200 illustrated in FIGS. 1 and 2. The portal 302 can be used for managing services of communication systems 100-200. The portal 302 can be accessed by a Uniform Resource Locator (URL) with a common Internet browser using an Internet-capable communication device such as those illustrated FIGS. 1-2. The portal 302 can be configured, for example, to access a media processor 106 and services managed thereby such as a Digital Video Recorder (DVR), a VoD catalog, an EPG, video gaming profile, a personal catalog (such as personal videos, pictures, audio recordings, etc.) stored in the media processor, provisioning IMS services described earlier, provisioning Internet services, provisioning cellular phone services, and so on.

Figure 4:
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2 and other communications described herein. The communication device 400 can comprise a wireline and/or wireless transceiver 402 (herein transceiver 402), a user interface (UI) 404, a power supply 414, a location detector 416, and a controller 406 for managing operations thereof. The transceiver 402 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio for hands free operation. The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location detector 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
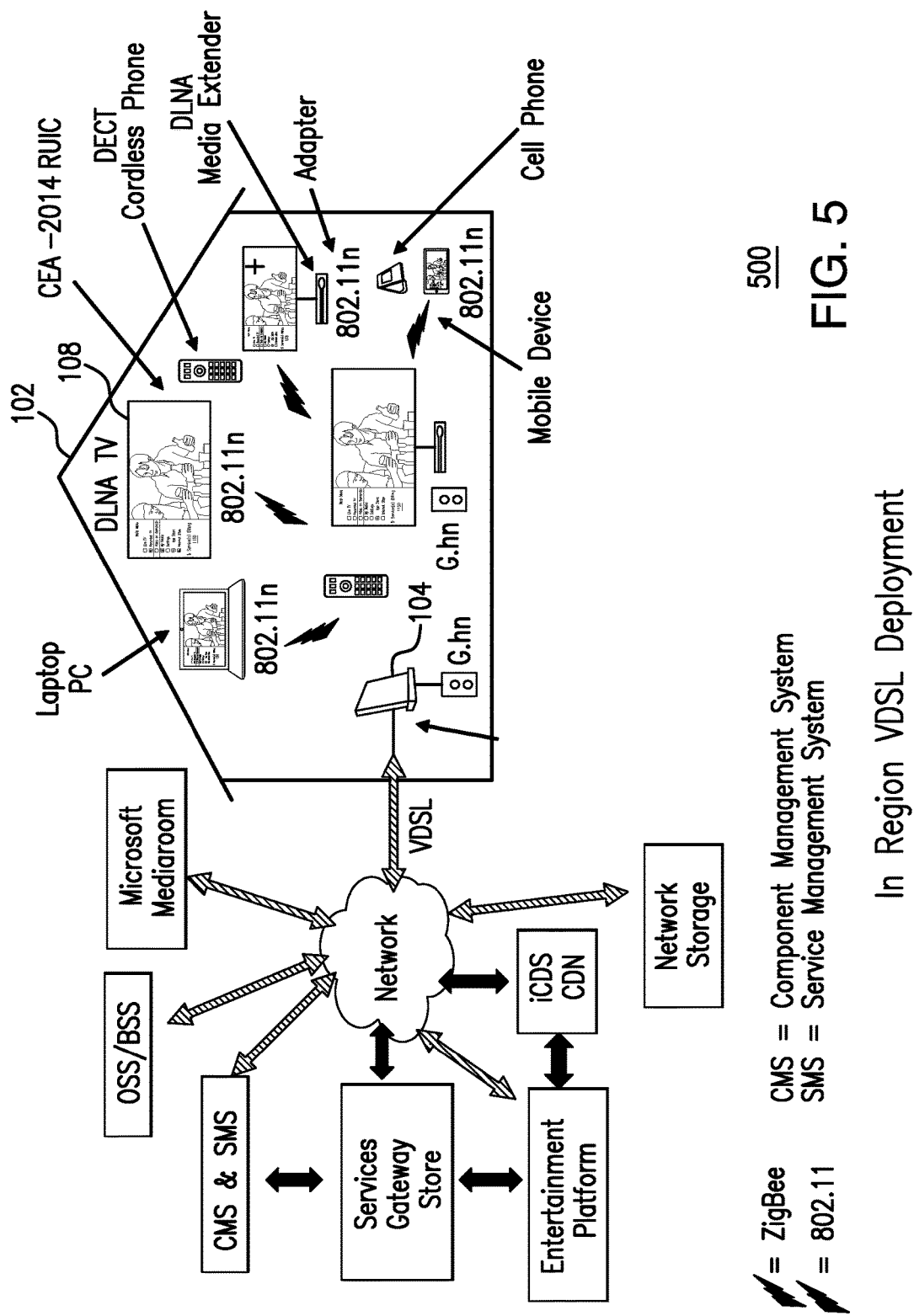
FIGS. 5-8 depict illustrative embodiments of communication systems that provide media services.

FIG. 5 depicts an illustrative embodiment of a communication system 500 employing an in-region VDSL deployment of the services gateway 104. Communication system 500 can be overlaid or operably coupled with communication systems 100 and 200 as another representative embodiment of communication systems 100 and 200. Multimedia content from a plurality of different service providers using a plurality of different delivery protocols can be delivered via the gateway 104 directly to one or more display devices 108 in the residence 102. Communication between the gateway 104 and the display devices 108 can be via various means including hardwire, 802.11 protocol, Zigbee standard and G.hn protocol. The gateway 104 can convert media content delivered via different protocols to a common format deliverable directly to each of the display devices 108 without using a set top box.

Figure 6:
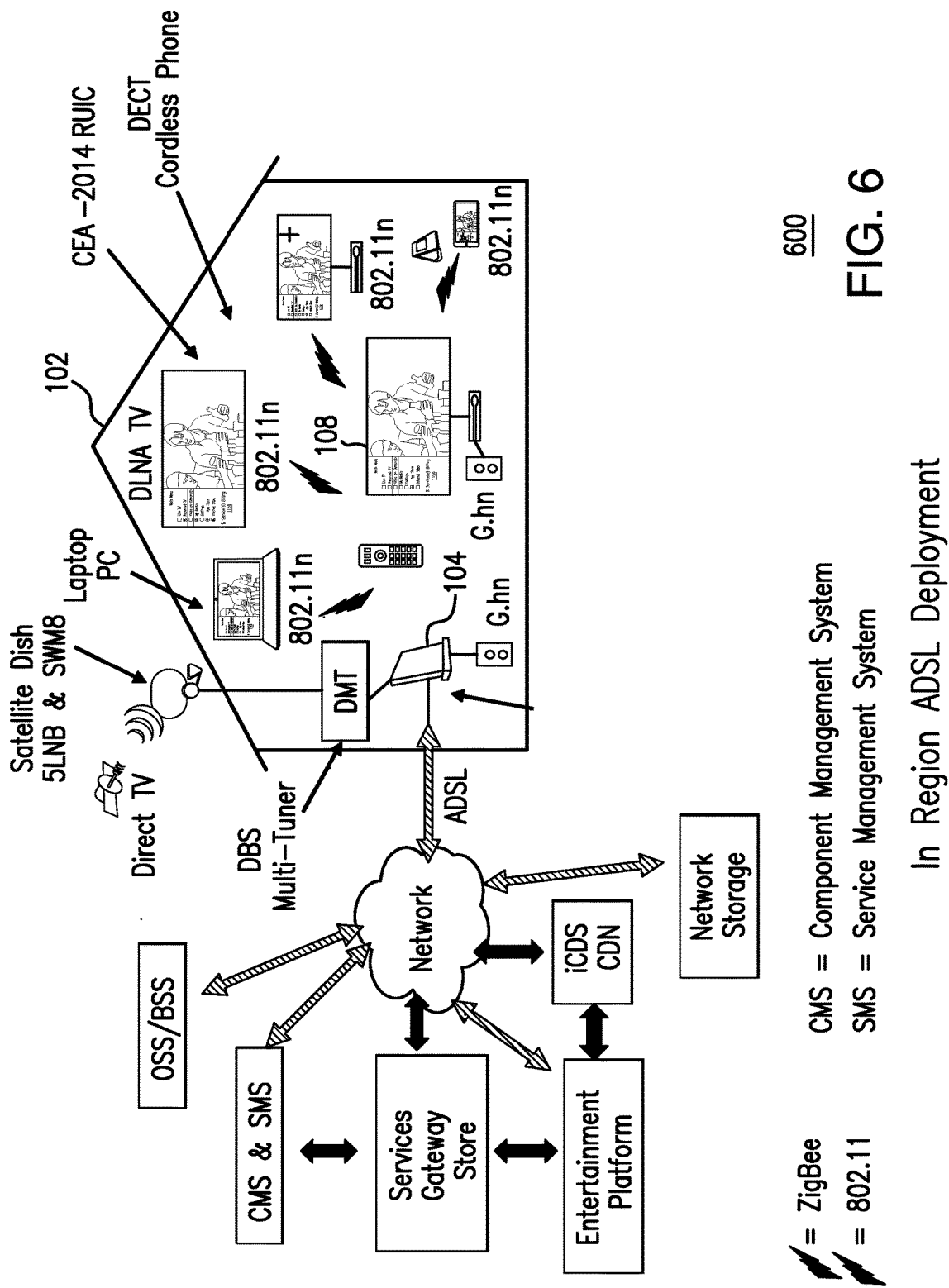

FIG. 6 depicts an illustrative embodiment of a communication system 600 employing an in-region ADSL deployment of the services gateway 104. Communication system 600 can be overlaid or operably coupled with communication systems 100 and 200 as another representative embodiment of communication systems 100 and 200. Multimedia content from a plurality of different service providers using a plurality of different delivery protocols can be delivered via the gateway 104 directly to one or more display devices 108 in the residence 102. In one embodiment, a separate DBS multi-tuner can be utilized between a satellite dish and the gateway 104. Communication between the gateway 104 and the display devices 108 can be via various means including hardwire, 802.11 protocol, Zigbee standard and G.hn protocol.

Figure 7:
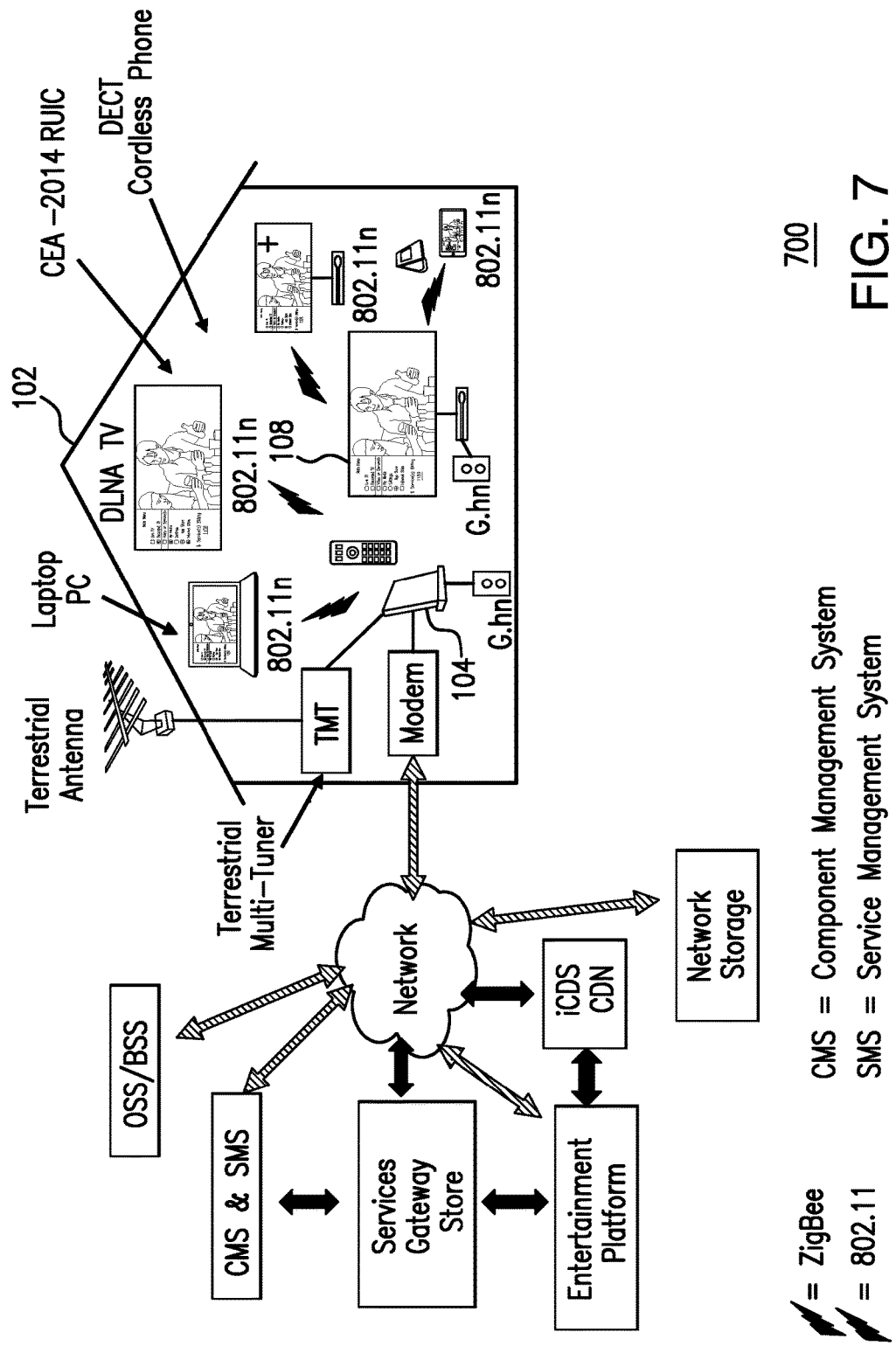

FIG. 7 depicts an illustrative embodiment of a communication system 700 employing an out-of-region deployment of the services gateway 104. Communication system 700 can be overlaid or operably coupled with communication systems 100 and 200 as another representative embodiment of communication systems 100 and 200. Multimedia content from a plurality of different service providers using a plurality of different delivery protocols can be delivered via the gateway 104 directly to one or more display devices 108 in the residence 102. In one embodiment, a separate terrestrial multi-tuner can be utilized between an antenna and the gateway 104. Communication between the gateway 104 and the display devices 108 can be via various means including hardwire, 802.11 protocol, Zigbee standard and G.hn protocol.

Figure 8:
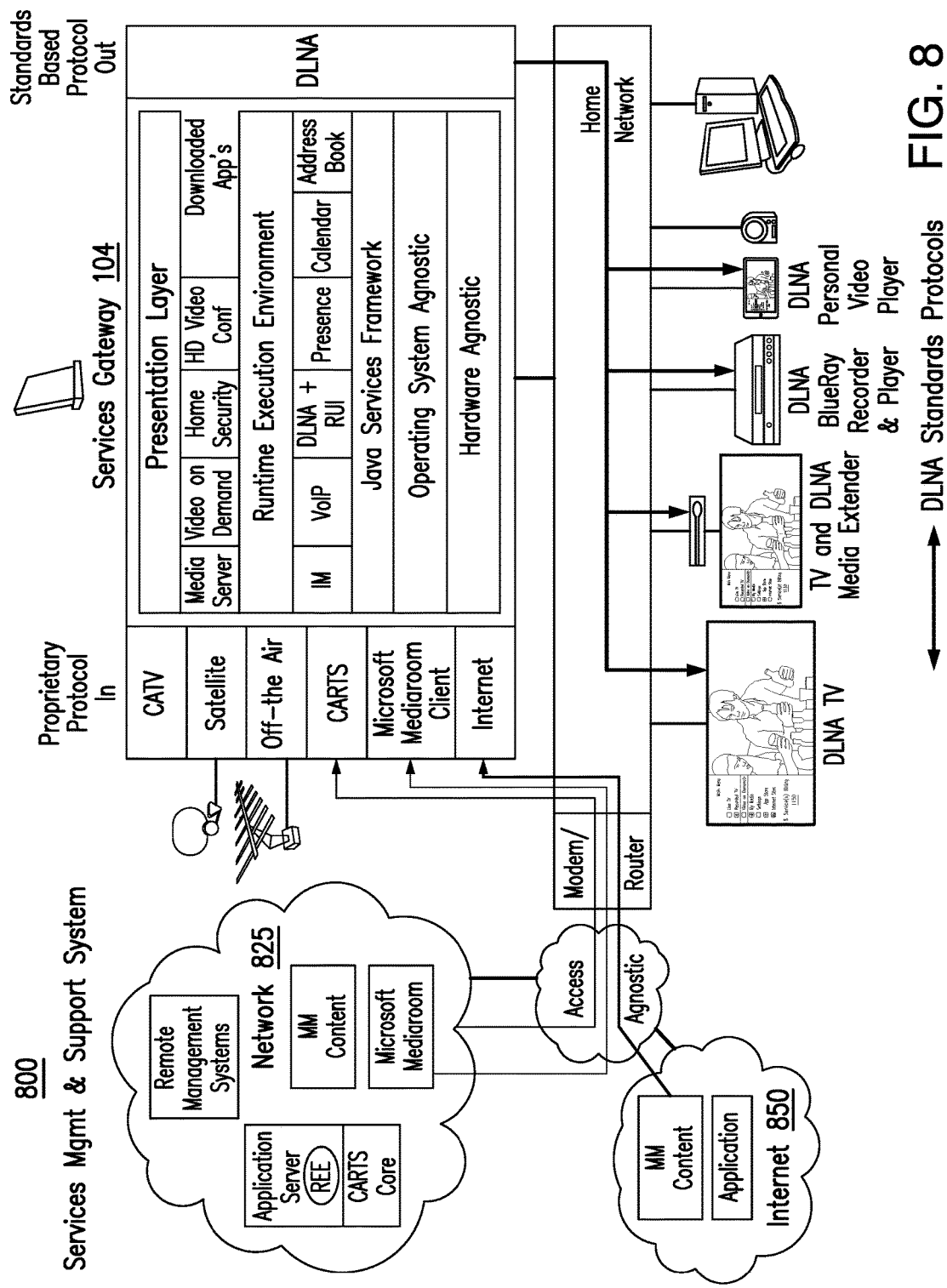

FIG. 8 depicts an illustrative embodiment of a communication system 800 employing the gateway 104 for delivery of media content from a plurality of service providers. Communication system 800 can be overlaid or operably coupled with communication systems 100 and 200 as another representative embodiment of communication systems 100 and 200. In one embodiment, multimedia content from a plurality of different service providers using a plurality of different delivery protocols can be delivered via the gateway 104 directly to one or more display devices 108 in the residence 102, which can bypass any existing set top boxes in the building 102. In one embodiment, the media content is converted to and delivered via DLNA protocol or format. Communication between the gateway 104 and the display devices 108 can be via various means including hardwire, 802.11 protocol, Zigbee standard and G.hn protocol.

In system 800, the gateway 104 can receive data formatted using proprietary protocols, such as protocols for CATV, Satellite, and Off-the-air, and can provide the data to display devices using DLNA standards or another standard. In one embodiment, system 800 can implement Digital Transmission Content Protection (DTCP) in delivering and presenting media content. For instance, media content received at the gateway 104 can be formatted using DTCP so that the media content can be selectively presented at one or more of the display devices 108. DTCP can be utilized so that the media content can only be presented under the control of the service provider.

Figure 9:
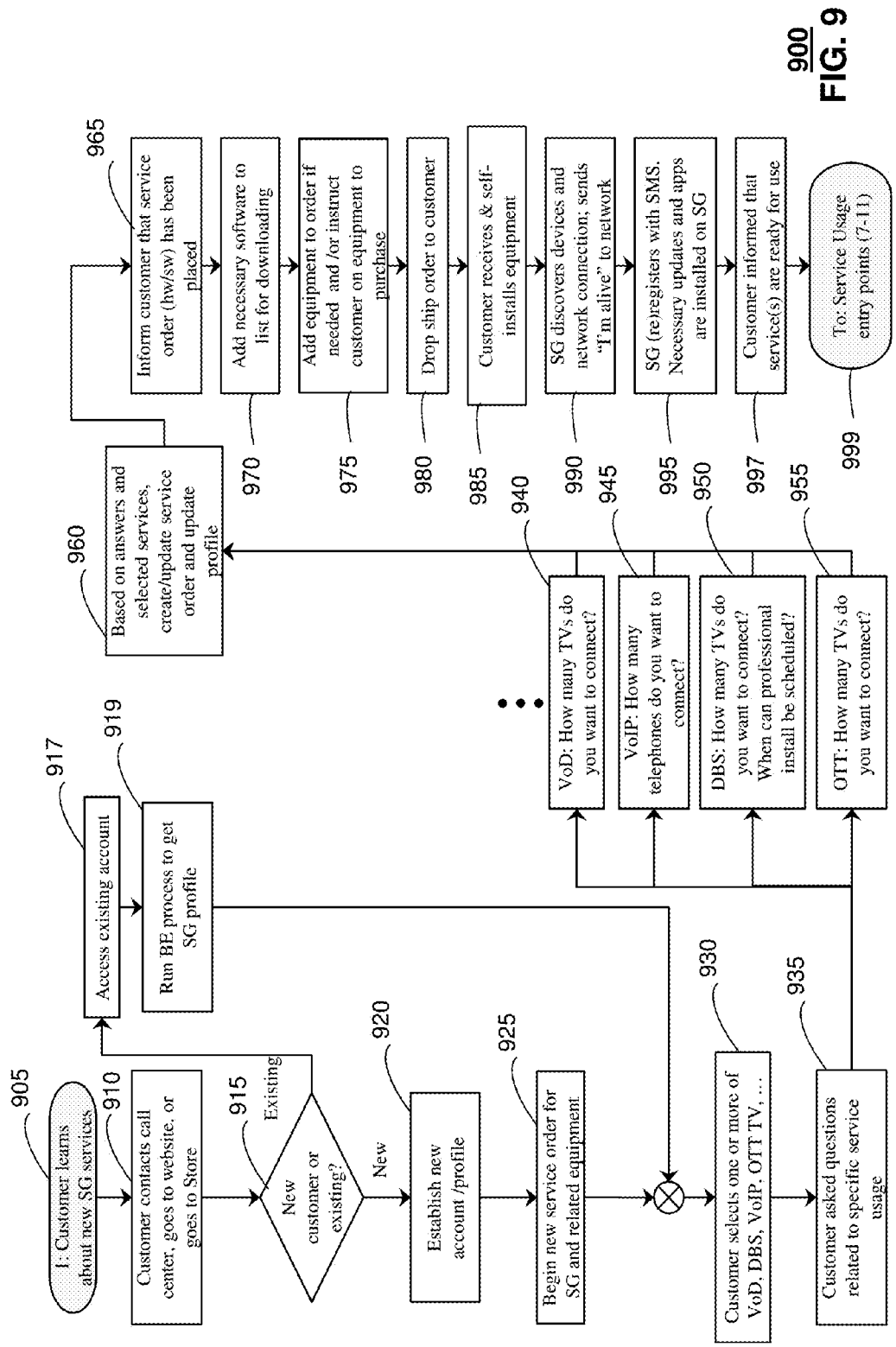
FIGS. 9-10 depict illustrative embodiments of methods operating in portions of the devices and systems of FIGS. 1-8.
Figure 10:
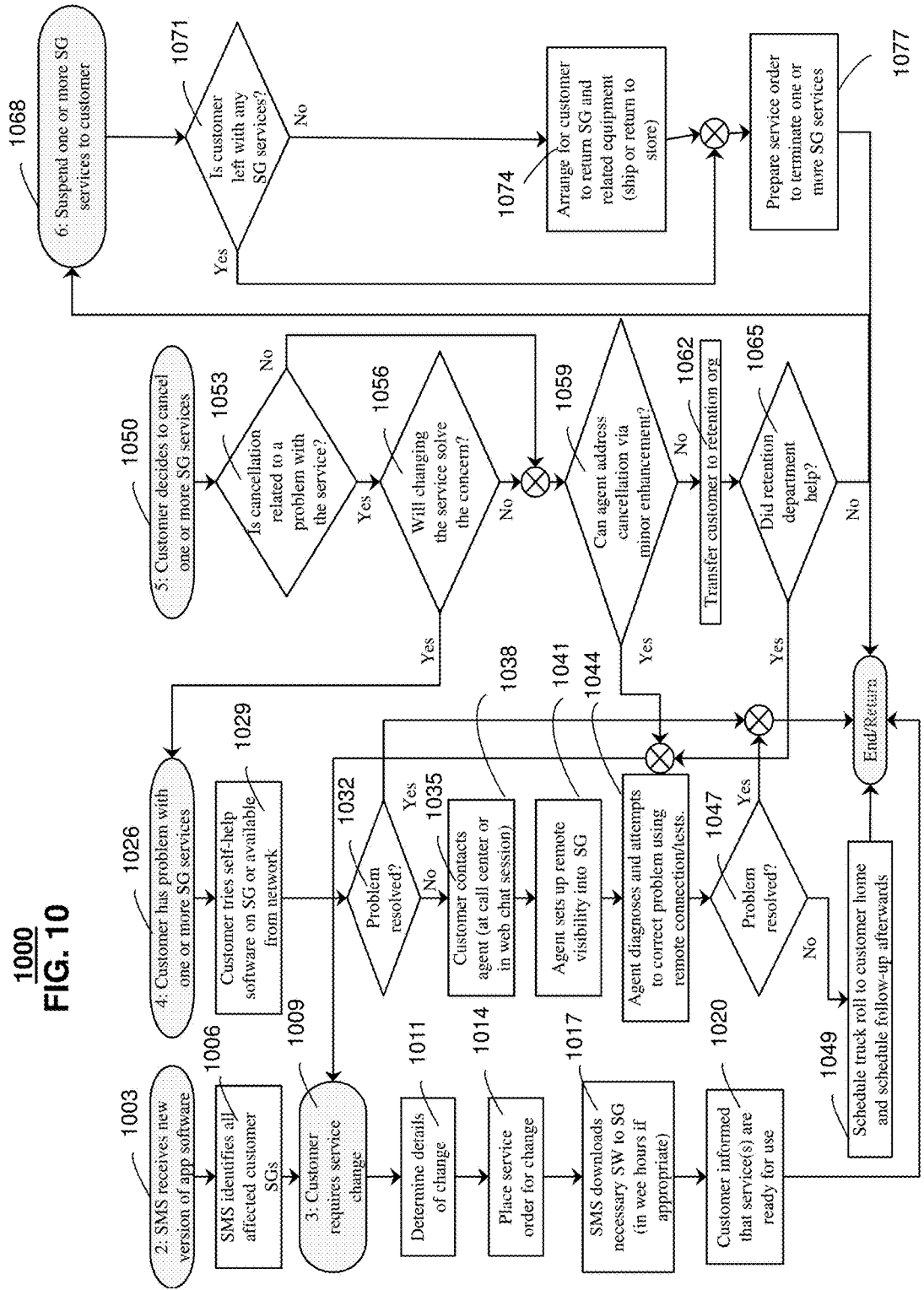

FIG. 9 depicts an illustrative embodiment of a method 900 operating in portions of the devices and systems described herein and/or illustrated in FIGS. 1-8. Method 800 can begin with step 905 where a customer learns of a new service offered through the services gateway and in step 910 contacts the service provider regarding the service. In steps 915, 920 and 925, a new profile can be established for a new customer and a new service order generated for same. Otherwise, in steps 915, 917 and 919, an existing profile is accessed. In steps 930, 935, 940, 945, 950 and 955, the service provider can obtain various information from the customer regarding the desired service. In steps 960 and 965, a service order is generated and the customer is notified of same. In steps 970 and 975, downloading of the associated applications for the service can be performed, such as without knowledge of the customer. The download can be performed according to various schedules, including network load, user usage patterns (e.g., based on monitored behavior or scheduled events), and other criteria. In step 980, the equipment associated with the services can be drop shipped to the customer and in step 985 installation of the equipment can be performed, including self-installation. In steps 990, 995 and 997, detection of the equipment and/or downloaded software by the gateway can be performed. In one embodiment, software updates can be performed at the time of the equipment installation. In another embodiment, the software download for the particular service can be performed after the equipment is installed and detected. Method 900 then continues in step 999 to the service usage entry points.

Method 1000 is a continuation of method 900 and includes step 1003 where the Service Management System receives a new version of software for a particular service. In steps 1006, 1009, 1011, 1014, 1017 and 1020, all affected customers can be identified, downloads can be performed, and customer notification can be performed. In steps 1026 and 1029, issues arising with a service can be initially handled via self-help software available on the gateway or available through the network. For example, self-help software can be an application that is used for diagnosing an issue and providing instructions to a customer without provider personnel intervention. If the issue is not resolved, then in steps 1035, 1041 and 1044, a provider agent can apply remote diagnosis and correction to the customer's home network. The remote diagnosis and correction can be based on remote testing, video conferencing with the customer and other techniques. If in step 1047, this does not resolve the issue, then in step 1049 a service visit can be performed.

In steps 1050 and 1053, where a customer cancels a service, it can be determined whether the cancellation is related to an issue with the service. In steps 1056, 1059, 1062 and 1065, it can be determined whether changing the service, equipment enhancement or contacting the retention personnel can resolve the cancellation issue. In steps 1068 and 1071, where a service is being suspended, it can be determined whether the customer has any services remaining. In steps 1074 and 1077, equipment return can be arranged and the corresponding service orders can be generated.

Figure 11:
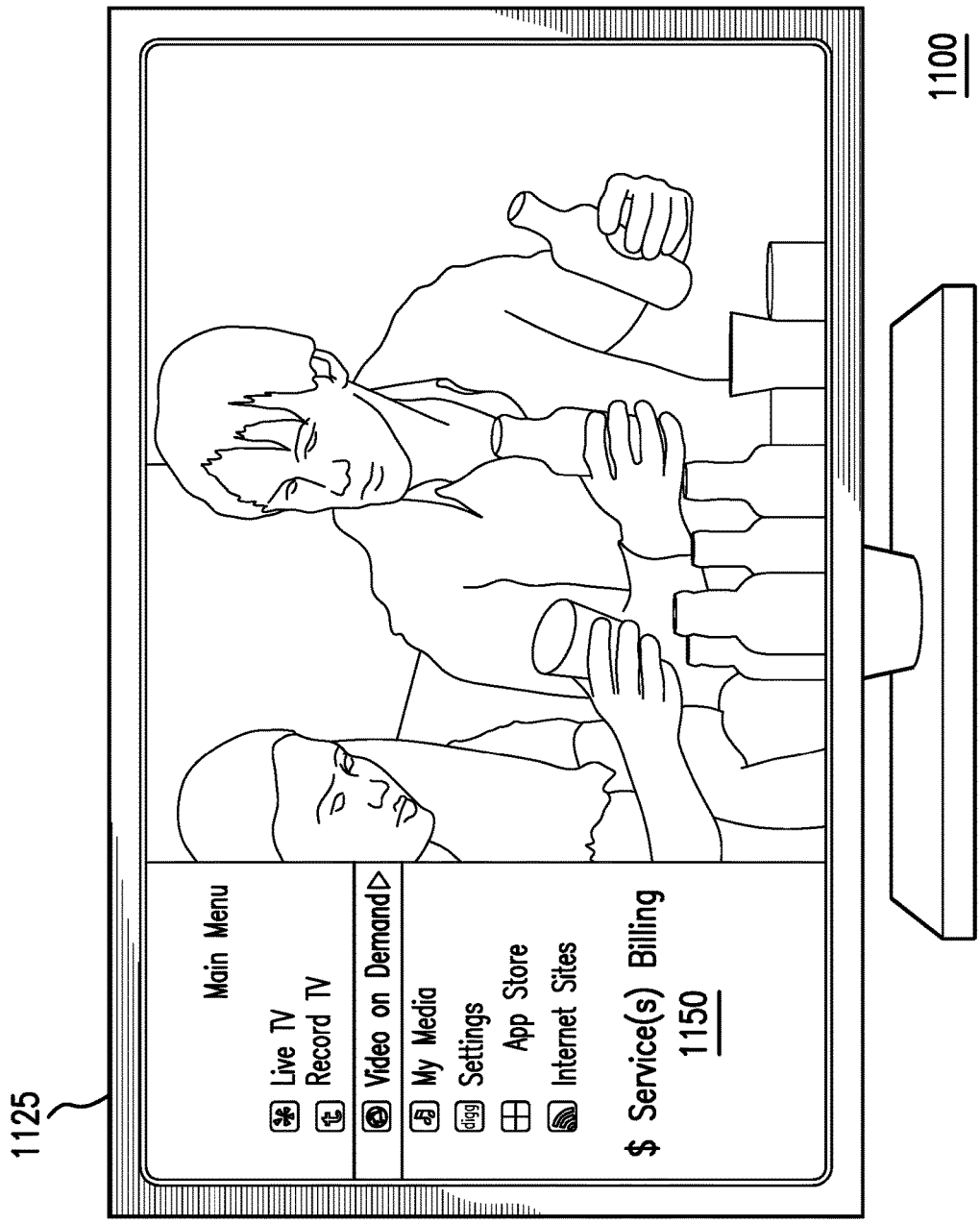
FIG. 11 depicts an illustrative embodiment of a Graphical User Interface that can be used in the devices and systems of FIGS. 1-8.

FIG. 11 depicts an illustrative embodiment of a display device 108 having a Graphical User Interface (GUI) 1125. The GUI 1125 can be generated by the gateway 104 and presented at each of the display devices throughout the building 102. In one embodiment, the GUI 1125 can be adjusted by the receiving display device to better suit presentation on a particular display device, such as adjusting the resolution for display on a cell phone. The GUI 1125 can include a first window in which media content continues to be presented at the display device 108 and a second window, which includes options for obtaining information and otherwise manipulating services provided by the gateway 104, which can include broadcast programming, recorded TV, VoD, internet, and/or applications.

In one embodiment, the GUI 1125 can present real-time data 1150 corresponding to services being utilized and/or consumed by the consumer. For instance, the data 1150 can be a financial counter that displays a current cost to the consumer for the services that are being provided. The services can be from one or more service providers and can be one or more types of different services. In one embodiment, the consumer can select the types of services that are to be included in the presentation of the financial counter. For example, a consumer can elect to display an aggregate financial counter for telephone, water, power and internet access that is being provided to the building 102. The financial calculator can be based on data that is generated in whole or in part by remote monitoring. For example, data can be gathered at the building 102 and transmitted from the gateway 104 to the particular service provider so that billing data can be generated. The billing data can then be transmitted back to the gateway 104 and presented in the financial counter of GUI 1125.

In another embodiment, the gateway 104 can determine the financial data without intervention on the part of the service provider. For instance, power consumption can be monitored from a power meter of the building 102 and transmitted, such as through a transmitter affixed to the meter using Zigbee protocol, to the gateway 104 where the financial counter is generated by the gateway for presentation in GUI 1125. The monitored data can also be transmitted from the gateway 104 to the service provider so that the service provider maintains a record of the billing records. The financial counter can be restarted for a new billing period and/or based upon receipt of payment for the services.

In one embodiment, the GUI 1125 can be used to provide conservation information to the consumer to assist the consumer in reducing costs for the services being provided or otherwise making the provided services more cost effective. For instance, the GUI 1125 can indicate times when services are at a lower cost, such as indicating to the consumer that they can raise the temperature of their air conditioning during peak times to reduce energy costs. In another embodiment, non-financial data can be presented in the GUI 1125, such as consumption, including broken down by device or device type.

In another embodiment, third party services can be provided through the gateway 104 without the identity of the third party being revealed to the consumer, including through charging an account of the consumer associated with the gateway (e.g., a telephone account, IPTV account, Internet access account) for the third party service. As described above, the third party service can be of various types including telecommunication services and non-telecommunication services. In one embodiment, the third party services can include purchase of an application (and/or equipment associated with the application) via the gateway 104, with or without the identity of the third party being revealed and with or without charging an account associated with the gateway.

Upon reviewing the aforementioned embodiments, it would be evident to an artisan with ordinary skill in the art that said embodiments can be modified, reduced, or enhanced without departing from the scope and spirit of the claims described below. In one embodiment, the remote monitoring can be associated with security services for the building 102. The gateway 104 can transmit data associated with the security of the residence 102, such as an alarm at the residence being triggered. The third party security service can utilize the gateway 104 to obtain additional data associated with the security, such as recorded video from a security camera that is stored in a memory of the home network. In another example, the third party security provider can adjust the service using the gateway 104 in response to receipt of the security data. For instance, the gateway 104 can be used to communicate control signals from the security service provider to video cameras at the residence 102 (such as rotating the cameras to adjust the view, automatically locking doors, and so forth).

In one embodiment, the applications downloaded to the gateway 104 can be removed from a memory of the gateway, or elsewhere in the home network of the building 102, when the service is cancelled. In another embodiment, the downloaded applications can be disabled when the service is cancelled.

In another embodiment, the delivery of the media content from different service providers can be aggregated to provide a uniform presentation. In another embodiment, the uniform presentation can be performed without identifying the service provider(s) delivering the media content. For instance, broadcast programming can be obtained from different service providers but presented at channels having similar GUI's (e.g., information preview windows and so forth). In another embodiment, the source of the media content can be indicated in an EPG or the like, although the present disclosure contemplates the presentation of the media content being performed via a uniform setting without identifying the various service providers that are the source of the particular content.

In one embodiment, the gateway 104 can selectively bypass the set top box 106 and deliver the media content directly to the display device 108. For example, the gateway 104 can determine a type or format of media content that is being received and can determine if the media content is compatible with a set top box 106 connected with a particular display device 108. If there is an incompatibility determined, then the gateway 104 can bypass the set top box 106 and deliver the media content directly to the display device 108. In another example, the gateway 104 can determine the compatibility issue and can reformat the media content for delivery based on the compatibility determination.

Other suitable modifications can be applied to the present disclosure without departing from the scope of the claims below. Accordingly, the reader is directed to the claims section for a fuller understanding of the breadth and scope of the present disclosure.

Figure 12:
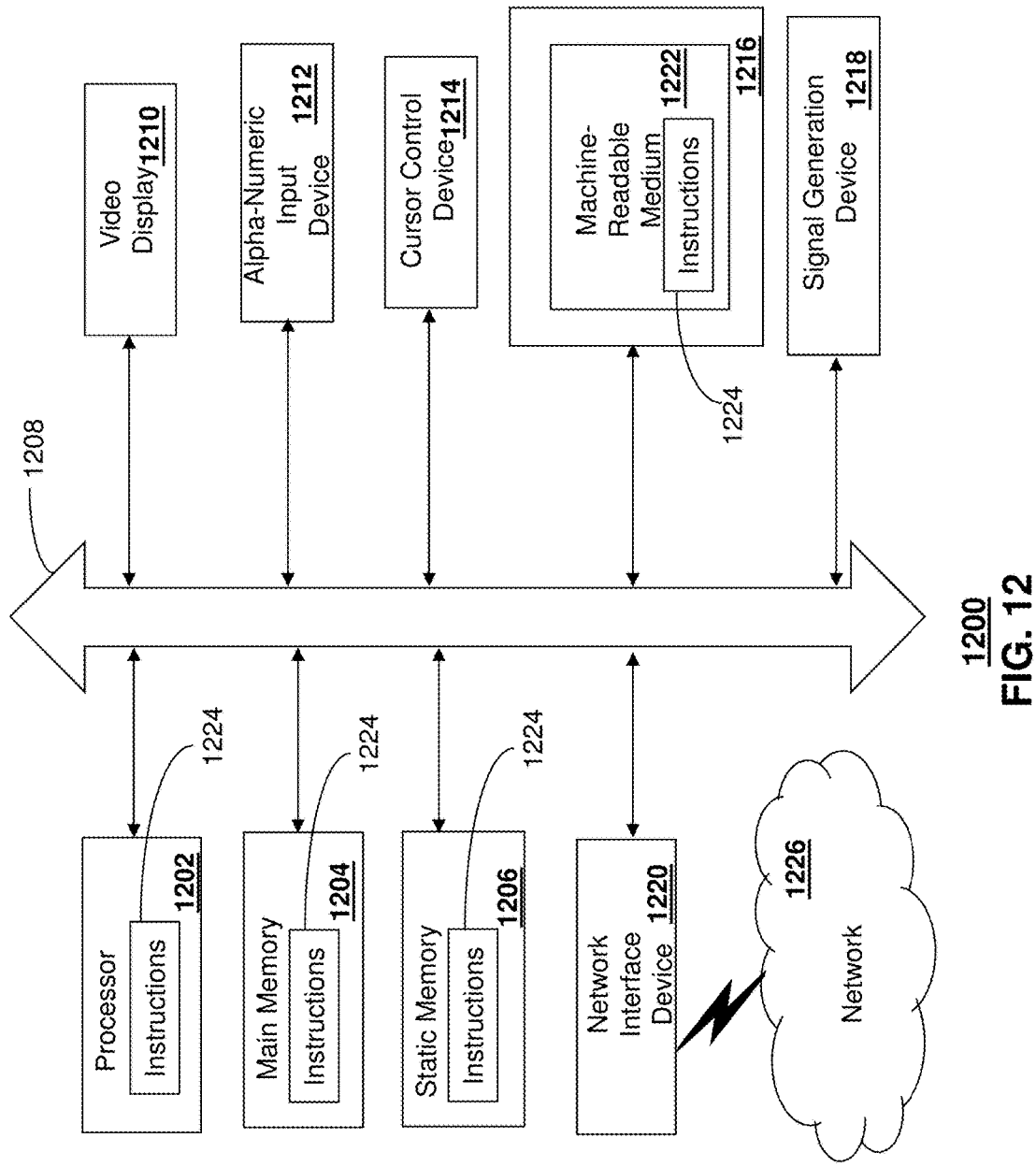
FIG. 12 is a diagrammatic representation of a machine in the form of a computer system within which a set of instructions, when executed, may cause the machine to perform any one or more of the methodologies discussed herein.

FIG. 12 depicts an exemplary diagrammatic representation of a machine in the form of a computer system 1200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU, or both), a main memory 1204 and a static memory 1206, which communicate with each other via a bus 1208. The computer system 1200 may further include a video display unit 1210 (e.g., a liquid crystal display (LCD), a flat panel, a solid state display, or a cathode ray tube (CRT)). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a machine-readable medium 1222 on which is stored one or more sets of instructions (e.g., software 1224) embodying any one or more of the methodologies or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1224, or that which receives and executes instructions 1224 from a propagated signal so that a device connected to a network environment 1226 can send or receive voice, video or data, and to communicate over the network 1226 using the instructions 1224. The instructions 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway, comprising:
   a processing system including a processor; and
   a memory that stores executable instructions that, when executed by the processing system, facilitate performance of operations, comprising:
      receiving media content comprising first media content and second media content, the first media content being received from a first system of a first service provider, the second media content being received from a second system of a second service provider, wherein the media content is received from the first and second systems by the processor using different transport protocols, wherein the processor is located at a user premises, wherein the first media content is received from the first system over a first access network managed by the first service provider via a hardwire connection with the processor, and wherein the second media content is received from the second system over a second access network managed by the second service provider via a wireless connection without utilizing the first access network;
      reformatting the media content to generate reformatted media content that is based on a standard protocol for a plurality of display devices at the user premises, wherein the standard protocol defines a common format for each of the plurality of display devices;
      providing the reformatted media content from the processor to the plurality of display devices at the user premises by selectively bypassing a media processor, wherein the bypassing comprises providing the reformatted media content from the processor to the plurality of display devices via a communication path that does not include the media processor;
      receiving a request for a service associated with a third service provider, the request being received at the processor;
      receiving an application resource bundle at the processor to enable the service, wherein the application resource bundle is received from a server associated with one of the first or second systems, and wherein the server is not associated with the third service provider;
      determining an incompatibility between additional media content and the media processor; and reformatting the additional media content based the incompatibility to generate a reformatted additional media content according to the standard protocol.

2. The gateway of claim 1, wherein the application resource bundle being received from a server is associated with one of the first or second systems,
wherein the server is not associated with the third service provider; and
wherein the operations further comprise enabling the service without providing an identification of the third service provider to the media processor.

3. The gateway of claim 2, wherein the processor provides a graphical user interface for presentation on one of the plurality of display devices, and
wherein the graphical user interface displays and adjusts a cost for use of the service associated with the third service provider.

4. The gateway of claim 3, wherein the graphical user interface displays and adjusts the cost for use of the service without identifying the third service provider.

5. The gateway of claim 2, wherein the receiving the application resource bundle comprises downloading data of the application resource bundle at a time point based on a monitoring of the media processor.

6. The gateway of claim 5, wherein the time point is determined based on network usage.

7. The gateway of claim 2, wherein the service associated with the third service provider comprises one of a utility service or medical monitoring service,
wherein the operations further comprise providing a graphical user interface for presentation on the plurality of display devices, and
wherein the graphical user interface indicates financial data indexed by one of the plurality of display devices that uses the service associated with the third service provider.

8. The gateway of claim 2, wherein the operations further comprise:
removing the application resource bundle from the memory responsive to the service being cancelled or suspended;
receiving the additional media content from first and second systems of first and second service providers, wherein the first and second systems deliver the additional media content to the processor using different transport protocols; and
providing the reformatted additional media content from the processor to the media processor.

9. The gateway of claim 1, wherein the selectively bypassing a media processor comprises:
transmitting a first portion of the media content to a first display device of the plurality of display devices utilizing a power line in the user premises; and
transmitting a second portion of the media content to a second display device of the plurality of display devices utilizing a wireless connection between the processor and the second display device.

10. A non-transitory, machine-readable storage medium, comprising instructions, wherein responsive to executing the instructions, a processor of a gateway performs operations comprising:
receiving media content at the gateway of a user premises, the media content comprising first media content and second media content, the first media content being received from a first system of a first service provider that manages a first access network, the second media content being received from a second system of a second service provider that manages a second access network, wherein the first media content is received over the first access network via a hardwire connection with the gateway, wherein the second media content is received at the user premises over the second access network via a wireless connection without utilizing the first access network;
determining, at the gateway, an incompatibility between the media content and a media processor in communication with the gateway;
receiving, at the gateway, a request for a service associated with a third service provider;
enabling the service without identifying the third service provider by utilizing an application resource bundle, wherein the application resource bundle is received from a server associated with one of the first or second systems, and wherein the server is not associated with the third service provider;
reformatting the media content to generate reformatted media content that is based on a standard protocol for a plurality of display devices at the user premises, wherein the standard protocol defines a common format for each of the plurality of display devices; and
providing the reformatted media content from the gateway to a display device by selectively bypassing the media processor responsive to the determining of the incompatibility, wherein the bypassing comprises providing the media content from the gateway to the display device via a communication path that does not include the media processor.

11. The non-transitory, machine-readable storage medium of claim 10, wherein the media content is received from the first and second service providers by the gateway using different transport protocols.

12. The non-transitory, machine-readable storage medium of claim 10, wherein the operations further comprise:
providing the media content from the gateway to a plurality of display devices by selectively bypassing the media processor by:
transmitting a first portion of the media content to a first display device of the plurality of display devices utilizing a power line in the user premises; and
transmitting a second portion of the media content to a second display device of the plurality of display devices utilizing a wireless connection between the gateway and the second display device.

13. The non-transitory, machine-readable storage medium of claim 10, wherein the operations further comprise:
determining an additional incompatibility between additional media content and the media processor;
reformatting the additional media content based the additional incompatibility to generate a reformatted additional media content according to the standard protocol; and
charging a purchase of the service to an account associated with one of the first and second service providers without providing an identification of the third service provider,
wherein the service associated with the third service provider is not a telecommunication service.

14. The non-transitory, machine-readable storage medium of claim 13, wherein the operations further comprise providing a graphical user interface for presentation on a plurality of display devices, wherein the graphical user interface displays and adjusts a cost for use of the service associated with the third service provider.

15. The non-transitory, machine-readable storage medium of claim 13, wherein the operations further comprise disabling the application resource bundle or deleting the application resource bundle from a memory of the gateway in response to a cancellation or suspension of the service.

16. A method, comprising:

receiving, by a processing system comprising a processor, media content at a gateway of a user premises, the media content comprising first media content and second media content, the first media content being received from a first system of a first service provider that manages a first access network, the second media content being received from a second system of a second service provider that manages a second access network, wherein the first media content is received from the first system over the first access network via a hardwire connection with the gateway, wherein the second media content is received from the second system at the user premises over the second access network via a wireless connection without utilizing the first access network, wherein the media content is received from the first and second service providers using different transport protocols;

determining, by the processing system, an incompatibility between the media content and a media processor in communication with the gateway;

reformatting, by the processing system, the media content to generate reformatted media content that is based on a standard protocol for a plurality of display devices at the user premises, wherein the standard protocol defines a common format for each of the plurality of display devices;

providing, by the processing system, the reformatted media content from the gateway to a display device by selectively bypassing the media processor responsive to the determining of the incompatibility, wherein the bypassing comprises providing the media content from the gateway to the display device along a communication path that does not include the media processor;

receiving, by the processing system, additional media content from first and second systems of first and second service providers, wherein the first and second systems deliver the additional media content to the processor using different transport protocols;

receiving, by the processing system, a request for a service associated with a third service provider, the request being received at the gateway;

receiving, by the processing system, an application resource bundle at the gateway to enable the service wherein the application resource bundle is received from a server associated with one of the first or second systems, and wherein the server is not associated with the third service provider;

determining, by the processing system, an additional incompatibility between the additional media content and the media processor;

reformatting, by the processing system, the additional media content based on the determining of the additional incompatibility to generate a reformatted additional media content according to the standard protocol; and providing, by the processing system, the reformatted additional media content from the processor to the media processor.

17. The method of claim 16, further comprising:

enabling, by the system, the service using the gateway; and enabling the service without providing an identification of the third service provider, wherein the application resource bundle being received from a server associated with the first service provider, wherein the server is not associated with the third service provider.

18. The method of claim 17, further comprising providing a graphical user interface from the gateway for presentation on the display device, wherein the graphical user interface displays and adjusts a cost for use of the service associated with the third service provider.

19. The method of claim 18, further comprising:

receiving data at the gateway from a device associated with the third service provider, the device being customer premises equipment; and determining the cost at the gateway based on the data.

20. The method of claim 17, further comprising disabling, by the system, the application resource bundle or deleting the application resource bundle from a memory of the gateway in response to a cancellation or suspension of the service.

* * * * *